United States Patent [19]

Goralski et al.

[11] 3,923,905

[45] Dec. 2, 1975

[54] METHOD OF PREPARING 2,3,5,6-TETRACHLOROBENZENETHIOL

[75] Inventors: Christian T. Goralski, Midland; George A. Burk, Bay City; R. Garth Pews, Midland, all of Mich.

[73] Assignee: The Dow Chemical Company, Midland, Mich.

[22] Filed: June 19, 1974

[21] Appl. No.: 480,659

[52] U.S. Cl............................................. 260/609 D
[51] Int. Cl.²...................................... C07C 149/34
[58] Field of Search............................... 260/609 D

[56] References Cited
OTHER PUBLICATIONS

Houben–Weyl, Method der Org. Chemie 9 p. 42 (1955).

*Primary Examiner*—Lewis Gotts
*Assistant Examiner*—D. R. Phillips
*Attorney, Agent, or Firm*—Ralph M. Mellom

[57] ABSTRACT

A method of preparing 2,3,5,6-tetrachlorobenzenethiols, comprising reaction of 2,3,5,6-tetrachloronitrobenzene with an alkali hydrosulfide hydrate or sulfide in a common solvent.

5 Claims, No Drawings

METHOD OF PREPARING 2,3,5,6-TETRACHLOROBENZENETHIOL

BACKGROUND OF THE INVENTION

The action of sodium hydrosulfide hydrate or sodium sulfide on nuclear substituted halogen substituted benzenes for the preparation of thiophenols has not found general application. The process is not satisfactory on aromatic halides apparently due to lower reactivity of the nuclear attached halogen. For the reaction to occur, higher temperatures are required which bring about unwanted side reactions. Where polychlorobenzenes are reacted with sodium sulfhydrate, a mixture of isomeric polychlorothiophenols is obtained, utilizing temperatures of from 100° to 170°C. Such a process may be found in U.S. Pat. No. 2,765,345.

SUMMARY OF THE INVENTION

We have now discovered a process for making 2,3,5,6-tetrachlorobenzenethiol in pure form without the production of unwanted isomers and other related by-products. The invention involves displacing the nitro group in 2,3,5,6-tetrachloronitrobenzene by reaction with an alkali hydrosulfide hydrate or sulfide in a common solvent. This thiol is useful in the preparation of antimicrobial agents.

Of the alkali hydrosulfide hydrates, the sodium salt is preferred, although the potassium or ammonium sulfhydrates may be used. The 70 percent flake commercial sodium sulfhydrate is satisfactory.

The reaction is preferably run at from about 25° to about 40°C although temperatures as low as 0° and as high as 150°C may be used.

The reaction is essentially stoichiometric; thus, from 1 to about 2 equivalents of the alkali hydrosulfide per equivalent of the tetrachloronitrobenzene may be used.

The preferred solvents for carrying out this process are water miscible ethers such as dimethoxyethane, dioxane, tetrahydrofuran, diethylene glycol and dimethyl ether; however, many other organic solvents are operative. The function of the solvent is to permit solution of the alkali sulfhydrate, and bring it in intimate contact with the polychloronitrobenzene. The solvent is one in which both reactants are soluble at the temperatures employed. Alcohols such as methanol, ethanol, isopropanol, n-butanol, and ethylene glycol can be used, as well as other water soluble solvents such as pyridine.

SPECIFIC EMBODIMENTS

To a solution of 26.1 g. (0.10 mol) of 2,3,5,6-tetrachloronitrobenzene and 500 ml. of dimethoxyethane, which was stirred vigorously, were added 20.0 g. (ca. two-fold excess) of powdered sodium hydrosulfide hydrate. The reaction mixture was allowed to stir at room temperature for 2.5 hours, and then poured into 2,500 ml. of cold 5–10 percent hydrochloric acid to give a cream-colored solid. The solid was filtered off, washed with water, and vacuum dried to give 23.0 g. (98 percent yield) of 2,3,5,6-tetrachlorobenzenethiol having a melting point of 95°–96°C. 21.1 g. of this material was recrystallized from absolute ethanol to give 15.2 g. (m.p. 102°–104°C). The infrared spectrum of this material was identical to an authenic sample prepared from 2,3,5,6-tetrachlorophenol by the method outlined by Newman and Karnes, *J. Org. Chem.*, 31, 3980 (1966).

Similarly, the potassium and ammonium hydrosulfide hydrates are used to produce the 2,3,5,6-tetrachlorobenzenethiol. Similarly, sodium, potassium or ammonium sulfide is substituted for the alkali hydrosulfide hydrate to produce 2,3,5,6-tetrachlorobenzenethiol in a reaction of the sulfide with 2,3,5,6-tetrachloronitrobenzene.

What is claimed is:

1. A process for preparing 2,3,5,6-tetrachlorobenzenethiol which comprises reacting an alkali metal sulfhydrate or sulfide with 2,3,5,6-tetrachloronitrobenzene in a mole ratio of from 1:1 to about 2:1 at a temperature of from about 0°C to about 150°C in an inert organic solvent in which both reactants are soluble at the temperature employed.

2. A process for preparing 2,3,5,6-tetrachlorobenzenethiol as in claim 1 wherein sodium hydrosulfide hydrate is reacted with 2,3,5,6-tetrachloronitrobenzene.

3. The process of claim 2 wherein the temperature is from about 25° to about 40°C.

4. The process of claim 1 wherein the inert organic solvent is a water miscible ether selected from the group consisting of dimethoxyethane, dioxane, tetrahydrofuran, and diethylene glycol.

5. The process of claim 1 wherein sodium sulfide is reacted with 2,3,5,6-tetrachloronitrobenzene.

* * * * *